US006238612B1

(12) United States Patent
Allan et al.

(10) Patent No.: US 6,238,612 B1
(45) **Date of Patent: *May 29, 2001**

(54) PROCESS FOR THE PRODUCTION OF A DETERGENT COMPOSITION

(75) Inventors: Peter Stewart Allan, Chalfont St Peter; John Martin Cordell; Graeme Neil Irving, both of Bebington; Suresh Murigeppa Nadakatti; Vijay Mukund Naik, both of Bangalore; Christine Ann Overton; Frederick Edmund Stocker, both of Bebington; Karnik Tarverdi, Harrow, all of (GB)

(73) Assignee: Lever Brothers Company, division of Conopco, Inc., New York, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/078,817

(22) Filed: May 14, 1998

(30) Foreign Application Priority Data

| | | |
|---|---|---|
| May 16, 1997 | (GB) | 9710048 |
| Sep. 25, 1997 | (IN) | 560/BOM/97 |
| Dec. 19, 1997 | (GB) | 9726972 |

(51) Int. Cl.[7] .......... B29C 45/00; C11D 13/18; C11D 17/00

(52) U.S. Cl. .......... 264/325; 264/328.7; 264/328.1; 510/447

(58) Field of Search .......... 264/328.1, 328.7, 264/328.2, 328.16, 328.17, 50, 320, 325; 252/367.1; 422/129.1; 510/447, 449, 450, 440

(56) References Cited

U.S. PATENT DOCUMENTS

| | | | |
|---|---|---|---|
| 1,785,312 | * 12/1930 | Jones . | |
| 1,827,549 | * 10/1931 | Villain . | |
| 2,398,776 | * 4/1946 | Bodman . | |
| 2,975,485 | * 3/1961 | Wendt . | |
| 2,987,484 | 6/1961 | Lundberg et al. . | |
| 3,270,110 | 8/1966 | Downie et al. . | |
| 3,891,179 | * 6/1975 | Berman | 249/134 |
| 4,050,825 | * 9/1977 | Stein . | |
| 4,062,792 | * 12/1977 | McNabb . | |
| 4,164,385 | 8/1979 | Finkensiep . | |
| 4,183,448 | 1/1980 | Nash . | |
| 4,189,802 | 2/1980 | Lansbergen . | |
| 4,201,743 | 5/1980 | Perla et al. . | |
| 4,496,467 | * 1/1985 | Munteanu et al. . | |
| 5,703,025 | * 12/1997 | Zyngier et al. . | |

FOREIGN PATENT DOCUMENTS

| | | |
|---|---|---|
| 0321179 | 6/1989 | (EP) . |
| 666230 | 9/1929 | (FR) . |
| 250443 | 4/1926 | (GB) . |
| 725835 | 3/1955 | (GB) . |
| 875818 | 8/1981 | (GB) . |
| 2164895 | 4/1986 | (GB) . |
| 94/13778 | 6/1994 | (WO) . |

OTHER PUBLICATIONS

Frados, Joel, Plastics Engineering Handbook of the Society of the Plastics Industry, Inc., fourth edition, pp. 92–94, 1976.*

* cited by examiner

*Primary Examiner*—Jill L. Heitbrink
(74) *Attorney, Agent, or Firm*—Ronald A. Koatz

(57) ABSTRACT

A process for forming detergent bars comprising applying pressure to a detergent composition contained within a mould cavity. The detergent composition in the mould is in a substantially fluid or semi-solid state and the mould is substantially full before the pressure is applied.

9 Claims, No Drawings

PROCESS FOR THE PRODUCTION OF A DETERGENT COMPOSITION

TECHNICAL FIELD

The present invention relates to a process for forming detergent bars and detergent bars formed thereby. The detergent bars may be intended for personal wash or fabric wash.

BACKGROUND

One of the conventional methods of detergent bar manufacture is casting. In the casting process, a detergent composition in a heated, mobile and readily pourable state is introduced into the top of an enclosed cavity of the desired shape within a mould and the temperature of the composition is reduced until it solidifies either totally or partially, such that the bar is handleable. The mould is generally two-part, and the bar can be removed by opening the mould.

In order to be castable, the detergent formulation must be mobile and readily pourable at the elevated temperatures employed. The detergent melt, once in the mould, tends to cool slowly and unevenly. This can lead to unwanted structural orientations and segregation of ingredients.

Detergent formulations may be desired to be formed into bars in such a condition that they are not sufficiently fluid to be cast by conventional means. In this case, pressure can be used to deliver the detergent composition to the mould in, for example, an injection moulding process. The detergent composition will still require some further cooling and solidification within the mould cavity.

A major problem with such processes is that detergent compositions shrink in the mould as they cool and solidify. This is highly undesirable as the mould cavity is intended to impart a distinctive shape on the bar and often also a logo of some kind. Shrinkage can result in dimples, wrinkles or voids in the bar, or a depression at the fill point. Which of these bar imperfections occurs depends on factors such as the nature of the detergent composition at fill, the cooling mechanism employed, and the form and surface of the mould.

A further problem particularly associated with the delivery of semi-solid detergent compositions to a mould, is the formation of "weld lines" in the bars. Without being limited by theory, it is believed that as a material is delivered to a mould cavity, flow fronts of the material are created in the cavity as material is added and the cavity fills. Weld lines in the final bars are a result of interfaces between flow fronts of detergent material inside the mould cavity which have not blended together. Such weld lines may be visible to the consumer, and can lead to weaknesses in the bar, which may in turn lead to cracking in use.

Therefore, there is a need for a process for forming detergent compositions into good quality bars which have good appearance and physical characteristics. Such a process should prevent the imperfections so far associated with shrinkage, and, should allow the detergent composition to be fed to the mould in any desired physical state, and the bar formed to be any desired shape, with a well-defined logo if required.

The present inventors have found that if a pressure is applied to a detergent composition contained within a mould cavity then the problems associated with shrinkage of the detergent composition as it cools can be reduced.

Furthermore, the problems encountered when forming bars from semi-solid material, e.g. weld lines, can be alleviated and better logo definition can be obtained.

SUMMARY OF THE INVENTION

According to a first aspect, the present invention provides a process for forming detergent bars comprising applying pressure to a detergent composition contained within a mould cavity.

In order to maintain the total volume of detergent material in the mould cavity and improve shape reproduction, further detergent composition may be delivered to the mould cavity as the volume of detergent composition in the mould cavity decreases as it cools and shrinks.

Thus, according to a second aspect, the present invention provides a process for forming detergent bars comprising feeding a detergent composition into a mould cavity until it is substantially full and then creating a pressure on the detergent composition in the mould cavity by applying a pressure to a feed of a detergent composition in fluid contact with the material contained within the cavity.

If the detergent composition being delivered to a mould contains a quantity of a compressible material, e.g. a gas, then when a pressure is applied to the detergent composition contained within the mould, the volume of the compressible material will reduce. If the mould cavity is then closed, subsequent volume reduction of the detergent material (e.g. shrinkage on cooling) enables the compressible material volume to increase, thus maintaining the overall shape and volume of the bar.

Thus, according to a further aspect, the present invention provides a process for forming detergent bars comprising applying a pressure to a detergent composition contained within a mould cavity characterised in that the detergent composition contains a compressible gas component dispersed therein.

Unless specified more generally, references herein to the invention or to any preferred features apply to all aspects of the invention.

DETAILED DESCRIPTION OF THE INVENTION

Detergent compositions to be delivered to the mould can be in any form capable of being delivered to the mould. For example, the composition may be in a substantially fluid (e.g. molten, molten dispersion, liquid), substantially semi-solid or almost solid form, so long as the composition is sufficiently plastic to allow the material to be delivered to the mould as would be understood by the person skilled in the art.

The present invention envisages that detergent compositions which are not readily mobile and pourable (i.e. which are not conducive to casting) can be fed into a mould and formed into bars by techniques such as injection moulding.

Preferably, the detergent composition entering the mould cavity is in a substantially fluid or semi-solid state. A detergent composition may be considered to be in a semi-solid state if sufficient structure is present in the composition so that it no longer behaves like a simple liquid, as would be understood by the person skilled in the art. The term "melt" as used hereinafter, can include detergent compositions in a substantially fluid or semi-solid state.

Where the pressure applied to the mould is applied over a small cross-sectional area, e.g. at the gate of the mould, it will be clear to the skilled person that the benefits of the present invention will not be obtained if the material in the mould cavity is allowed to solidify to too great an extent before a pressure is applied. Preferably, the material in the mould is in a substantially fluid or semi-solid state when the pressure is first applied.

The material should be such that it is capable of transmitting pressure applied for example at the gate of the mould cavity, through the material in the cavity.

Preferably, pressure is applied to the detergent material contained within the mould cavity whilst at least part of the detergent material therein is solidifying.

Preferably, the mould is substantially full before the pressure is applied.

Moulds used in detergent bar manufacture typically comprise a cavity defined by a rigid material. Typically, a mould comprises two (or more) rigid complementary die parts which on engagement define a cavity corresponding to the total shape of the article to be manufactured in a casting or injection moulding process and a gate. The detergent melt is fed to the mould cavity through an orifice or "gate" in the mould. The gate opens on one side to the cavity and may open on the other side to a neck (e.g. a small channel) through which detergent composition can be fed to the mould cavity. The neck may be designed to hold a relatively large quantity of detergent material, e.g. up to 20% of the mould cavity volume, if desired.

Moulds are generally constructed of materials with high thermal conductivity, e.g. aluminium. This is to aid cooling of the melt and hence shorten bar release times. The mould will be designed so that it can withstand the envisaged applied pressures without leakage, e.g. by provision of suitable sealing means such as "lips" and grooves, gaskets etc. between the mould parts. The mould will also be capable of being sealed at the gate, either by contact with the means for delivering detergent material, or by means of a separate closure device such as a valve or shutter.

In a conventional casting process, a detergent melt in a substantially fluid state and generally at a high temperature is fed to a mould until the mould cavity is full. If a detergent composition to be delivered is not in a fluid form, pressure may be applied to the detergent composition in order to deliver it to the mould cavity.

Once within the mould cavity, the detergent material is cooled, and this tends to result in a volume reduction of the detergent material. This may result in any of the following occurring: the detergent material pulls away from the mould wall, often preferentially over one part of the mould surface; the detergent material shrinks away from an internal imperfection(s) in the bar, leaving a "hole" or void(s) within the bar; the detergent material shrinks at the gate, leaving a depression there (a "sink mark"). Loss of contact with the mould wall is visible as dimples or wrinkles on the bar surface. Any depression at the gate is also readily observed. The presence of internal bar imperfections can be demonstrated non-intrusively by transmission X-ray techniques.

A problem particularly associated with the delivery of semi-solid detergent compositions to a mould, is the formation of "weld lines" in the bars. Without being limited by theory, it is believed that as a material is delivered to a mould cavity, flow fronts of the material are created in the cavity as material is added and the cavity fills. Weld lines in the final bars are a result of interfaces between flow fronts of detergent material inside the mould cavity which have not blended together properly. Such weld lines may be visible to the consumer, and can lead to weaknesses in the bar, which may in turn lead to cracking in use. These weld lines are also detectable by X-ray techniques.

The mould can be filled up to the gate (i.e. only the mould cavity can be filled) or more material may be added which will sit, for example, in the neck of the mould.

Where a mould cavity is filled and then immediately disconnected from the feeding means any of the aforementioned phenomena can occur.

If material at the entry to the mould cavity, or in the neck of the mould solidifies quickly, subsequent shrinkage of material within the cavity may result in internal voids and/or surface effects. If the point of entry to the mould cavity remains molten, depressions/imperfections at the position of the gate are likely.

According to the process of this invention, a pressure is applied to the detergent composition contained within the mould cavity, once the cavity is full. The pressure may be applied by any suitable device, e.g. a hydraulically or pneumatically driven piston or plunger.

In a preferred embodiment, a pressure can be applied to a detergent composition feed in fluid contact with the detergent composition in the mould cavity in order to force more material into the mould cavity and thus put the detergent composition in the mould cavity under pressure. The mould cavity can then be sealed or closed and the material contained therein allowed to cool and solidify.

The feed of detergent material to which a pressure is applied may be the same or a different detergent composition to that which is contained within the mould cavity.

Instead of closing or sealing the mould or mould cavity once a pressure has been created on the material therein, the pressure can continue to be applied on the detergent composition in the mould cavity by continuing to apply pressure to a detergent composition feed in fluid contact with the detergent composition contained within the mould cavity. Continuing to apply pressure to a detergent composition feed may mean maintaining the existing pressure on the material in the mould cavity or even increasing it.

Of course, if pressure is being applied to a detergent feed in order to create a pressure on the material contained within a mould cavity, then the detergent feed must be capable of transmitting that pressure, i.e. it is preferably in a fluid or semi-solid state. In this respect, it may be necessary to keep the detergent feed above a minimum temperature by heating it. Of course any heating means present should not interfere to any significant degree with the solidification process taking place in the mould, i.e. itcc should not heat the mould or the material in the mould to any significant degree, but only the feed outside the mould.

In a preferred embodiment, a detergent melt is fed to a mould comprising a cavity, a gate and a receptacle for detergent composition on the other side of the gate (e.g. a neck or reservoir), so that the cavity is full and there is some "surplus" detergent composition in the receptacle. A pressure is subsequently applied to the detergent composition in the receptacle using a suitable pressure applying means, such as, for example, a plunger or piston.

In the case of an injection moulding process where a pressure is applied to a feed of detergent composition in order to feed it into a mould, the pressure applied to the feed of detergent composition to deliver it to the mould cavity can continue to be applied to the feed of detergent composition after the mould cavity has been filled.

The pressure created in the mould cavity by the processes of the present invention may be high. For example, such pressures may be up to 1000 p.s.i. Typically, pressures from 50–800 p.s.i. can be employed. The pressure need not be constant over the time for which it is applied, i.e. it may increase or decrease.

All pressure figures are p.s.i. gauge (psig), i.e. the level above or below atmospheric pressure.

The time over which the pressure is applied to the detergent composition after the mould cavity has been filled will vary depending on, amongst other things, the properties of the detergent composition being delivered to the mould, and the cooling regime employed. For example, compositions being delivered to a mould in a substantially fluid state and at high temperatures may need a longer time than compositions which are delivered to a mould in a substantially semi-solid state and/or at a lower temperature.

Typically, the time is less than 2 minutes, preferably less than 1 minute, more preferably less than 30 seconds, and most preferably less than 10 seconds. The time may be very short, for example, less than 1 second.

The mould may be sealed whilst the pressure is being applied, for example by a valve or shutter, or the pressure may be applied for a period at least long enough to allow the material at the point of entry into the mould (e.g. the gate) to substantially solidify, i.e. to allow a seal to form at the gate so that any further pressure applied would no longer be transmitted to the material within the mould cavity.

Without being limited by theory, it is believed that when a detergent composition enters a mould cavity, the material closest to the walls of the mould cavity will cool and solidify more quickly than material in the centre of the mould cavity. This results in the formation of a "shell" around a more molten core. If the temperature of the mould is lower than the melt temperature when the mould is filled, this shell forms very quickly.

As there is no cool metal wall at the gate, the shell will tend to be thinner, incomplete or not even present there. Once the "wall shell" has formed, and is rigid relative to the remainder of the melt, further reduction in volume will therefore tend to act at the gate. Melt at the gate will be drawn into the mould cavity. If molten material is available outside the mould cavity at the gate, e.g. in a neck, this will be drawn into the mould cavity.

Another method by which a pressure can be created on the material in the mould cavity is by sealing or closing the cavity after it has been substantially filled, and then reducing the volume of the cavity. This could be achieved, for example, by moving a wall of the mould cavity, or part thereof, e.g. the logo on the inside of the mould could be moved further into the cavity. The latter method has the added advantage that it can improve the logo definition. In an alternative to sealing or closing the mould after filling, an external pressure could be maintained on the detergent composition in the cavity at any exit/entry point from the mould cavity, such as the gate, in order to maintain or even increase the pressure on the material contained within the cavity as the cavity volume is reduced.

The present invention also provides for partially filling a mould cavity with a detergent composition and then reducing the volume of the mould cavity until the detergent composition fills the volume of the cavity and a pressure is created on the material therein.

In a preferred embodiment, the detergent composition to be formed into bars contains a compressible component or components, such as, for example a gas. The detergent composition may be aerated or there may be gas present as a result of a manufacturing process (e.g. a mixing step or as a result of a chemical reaction). The volume of gas at ambient conditions may be sufficient to create floating bars, for example, or may be small enough as to not be detectable by the consumer, e.g. less than 5% by volume, preferably less than 2% by volume. The detergent composition containing a compressible gas component is delivered to a mould cavity until the cavity is substantially full and a pressure is then applied to a detergent composition feed in fluid contact with the detergent composition in the mould in order to force more material into the mould cavity. The compressible component (i.e. the gas) in the detergent composition in the mould cavity will be compressed and pressurised and more detergent material will enter the mould cavity. The mould can then either be sealed or closed or the pressure can be maintained on the detergent composition in fluid contact with the material inside the mould cavity for a period of time, as described previously. As the "non-compressible" material inside the cavity cools and decreases in volume, the volume occupied by the compressible component will increase.

In another aspect, the present invention provide a detergent bar obtainable by the process of the present invention.

By "detergent bar" is meant a solid, shaped object such as a tablet, cake or bar in which the level of surface active agent, which comprises soap, synthetic detergent active or a mixture thereof, is at least 5% by weight based on the bar.

The detergent bar may also comprise benefit agents for imparting or maintaining desirable properties for the skin. For example, moisturising agents may be included.

The detergent compositions may comprise homogeneous components or mixtures of components, or may comprise material suspended or dispersed in a continuous phase.

EXAMPLES

Example

Detergent formulation A was formed into detergent bars by an injection moulding process. The detergent composition was fed into a mould cavity by means of an injection device comprising an injection chamber, an actuator, and a nozzle.

The detergent composition A was in a semi-solid state when entering the mould cavity, at a temperature of 50–55 C. In all the runs, the mould was at ambient temperature before fill and cooling was effected by packing solid $CO_2$ around the outside of the mould for the period of time specified plus maintaining the mould at ambient temperature for a further 5 minutes.

| Formulation A was as follows: | wt % active |
|---|---|
| Directly esterified fatty isethionate | 27.8 |
| Sodium stearate | 14.6 |
| Propylene glycol | 17.8 |
| Stearic acid | 12.8 |
| PEG 8000 | 9.7 |
| Coco amido propyl betaine | 4.9 |
| Paraffin wax | 2.9 |
| Sodium isethionate | 0.4 |
| Water | 5.6 |
| Minor additives (preservatives, perfume, colour etc) | 2.5 |
| TOTAL | 100.0 |

The "hold time" referred to in Table 1 is the period of time over which pressure continued to be applied to the feed of detergent composition in the injection chamber after the mould cavity had been filled. After the hold time had elapsed, the mould was disconnected from the feed means.

The pressure measured in the injection chamber at a point just above the entry to the nozzle is recorded as the maximum injection pressure in Table 1. The average pressure inside the mould cavity (i.e. at a side wall) over the "hold time" period is recorded as the average mould pressure in Table 1.

These runs illustrate that the surface quality of the bars can be improved by applying a pressure to a detergent composition in a mould. No weld lines were observed in any of the bars.

TABLE 1

| Run | Fill temp (° C.) | Mould vol (g) | Cooling solid $CO_2$ (mins) | Ease of release | Hold time (s) | Aver mould press (psig) | Max inject press (psig) | Appearance |
|---|---|---|---|---|---|---|---|---|
| 1 | 53 | 125 | 0.5 | Slight adhesion to one side | 0.25 | 206 | 206 | Dimpled, mainly on one side |
| 2 | 53 | 125 | 0.5 | Easy | 1 | 150 | 260 | Very slightly dimpled |
| 3 | 52 | 125 | 0.5 | Easy | 6 | 155 | 204 | No dimples; very good surface |
| 4 | 53 | 125 | 0.5 | Easy | 6 | 165 | 234 | No dimples; very good surface |

What is claimed is:

1. A process for forming detergent bars comprising applying pressure to a detergent material contained within a mold cavity in one of the two following ways:

(1) said pressure to the material within the mold cavity is transmitted by applying pressure to a detergent composition feed found on the outside of said cavity such that the pressure applied to said feed is transmitted through the composition material in the cavity;

wherein said mold cavity is substantially full before said pressure is applied to said feed; and wherein said pressure continues to be applied to the feed after the cavity is filled; or (2) said pressure to the material within the mold cavity is created by either sealing or closing the cavity or by maintaining external pressure at a point of entry or exit after said cavity has been substantially filled and subsequently reducing the volume of the cavity;

wherein said detergent composition substantially fills the volume of the cavity before said pressure is created; and wherein pressure continues to be applied to the detergent composition material as cavity volume is reduced.

2. A process according to claim 1, wherein the pressure to said feed on the outside of said cavity is applied to a receptacle, neck or reservoir on the outside of said cavity in which said feed is found.

3. A process according to claim 1, wherein the pressure applied to said feed on the outside is applied using a suitable pressure applying means.

4. A process according to claim 3, wherein said means is a plunger or piston.

5. A process according to claim 1, wherein volume of cavity is reduced by moving a wall or part thereof of said mold cavity.

6. A composition according to claim 1, in which detergent composition in mold cavity is in substantially fluid or semi-fluid state when pressure is first applied.

7. A process according to claim 1, in which pressure is applied to the detergent composition contained within the mold cavity whilst at least part of the detergent composition is solidifying.

8. A process according to claim 1, in which the detergent composition contained within the mold cavity contains a compressible gas component dispersed therein.

9. A process according to claim 1, in which the time over which the pressure is applied to the detergent composition contained within the mold cavity is less than 2 minutes.

* * * * *